United States Patent
Hayashi et al.

(10) Patent No.: US 7,092,792 B2
(45) Date of Patent: Aug. 15, 2006

(54) ROBOT REMOTE MANIPULATION SYSTEM AND REMOTE MANIPULATION DEVICE

(75) Inventors: Kouki Hayashi, Yokosuka (JP); Akira Hiraiwa, deceased, late of Yokohama (JP); by Yumiko Hiraiwa, legal representative, Yokohama (JP); Hiroyuki Manabe, Yokosuka (JP); Takashi Ninjouji, Yokohama (JP); Toshiaki Sugimura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 318 days.

(21) Appl. No.: 10/644,912

(22) Filed: Aug. 21, 2003

(65) Prior Publication Data
US 2004/0137843 A1    Jul. 15, 2004

(30) Foreign Application Priority Data
Aug. 21, 2002  (JP)  ............................. 2002-241075

(51) Int. Cl.
*G06F 19/00*  (2006.01)
(52) U.S. Cl. ..................... 700/254; 700/249; 700/246; 700/250; 700/251; 700/257; 700/258; 700/259
(58) Field of Classification Search ............... 700/245, 700/254
See application file for complete search history.

(56) References Cited

U.S. PATENT DOCUMENTS

| | | | |
|---|---|---|---|
| 5,158,493 A |  | 10/1992 | Morgrey |
| 5,191,320 A |  | 3/1993 | MacKay |
| 5,459,659 A | * | 10/1995 | Takenaka ..................... 700/260 |
| 6,438,454 B1 | * | 8/2002 | Kuroki ........................ 700/245 |
| 6,480,761 B1 | * | 11/2002 | Ueno et al. .................. 700/245 |
| 6,493,606 B1 | * | 12/2002 | Saijo et al. ................. 700/245 |
| 6,580,969 B1 | * | 6/2003 | Ishida et al. ................. 700/245 |
| 6,832,132 B1 | * | 12/2004 | Ishida et al. ................. 700/245 |
| 2004/0036437 A1 | * | 2/2004 | Ito ........................ 318/568.12 |

FOREIGN PATENT DOCUMENTS

| | | |
|---|---|---|
| EP | 0 850 729 | 7/1998 |
| EP | 1 344 613 | 9/2003 |
| JP | 2001-198865 | 7/2001 |
| JP | 2002-46088 | 2/2002 |
| WO | WO 01/60474 | 8/2001 |
| WO | WO 02/40227 | 5/2002 |

(Continued)

OTHER PUBLICATIONS

Hirai et al., The development of Honda humanoid robot, 1998, IEEE, p. 1321-1326.*

(Continued)

*Primary Examiner*—Thomas G. Black
*Assistant Examiner*—McDieunel Marc
(74) *Attorney, Agent, or Firm*—Oblon, Spivak, McClelland, Maier & Neustadt, P.C.

(57) ABSTRACT

A robot remote manipulation system is provided, including a bipedal walking robot and a remote manipulation device for remotely manipulating the bipedal walking robot. The robot is connected to the remote manipulation device via a communication network and controlled by controlling data from the remote manipulation device. In the system, the remote manipulation device comprises a pair of bilateral mechanical rotating elements providing a quantity of motion for each bilateral leg of the bipedal walking robot; and a controlling data transmitter for transmitting controlling data corresponding to the quantities of motion to the bipedal walking robot. The bipedal walking robot comprises a controlling data receiver for receiving the controlling data transmitted from the remote manipulation device; and a leg motion controller for processing the received controlling data and causing the bilateral legs to move forward or backward.

10 Claims, 10 Drawing Sheets

FOREIGN PATENT DOCUMENTS

| | | |
|---|---|---|
| WO | WO 03/020476 | 3/2003 |
| WO | WO 03/035335 | 5/2003 |

OTHER PUBLICATIONS

Yamaguchi et al., Development of a bipedal humanoid robot having antagonistic driven joints and three DOF trunk, 1998, IEEE, p. 96-101.*

Robot.org., [It] begins in robot exposition "ROBODEX2000" and Pacifico Yokohama.—New robots such as Sony and Honda genera open it to the public -., 2001, Inaternet, p. 1-6.*

Ohm-sha, Robocon Magazine, No. 18, pp. 20-23, "TMSUK 04", 2001.

* cited by examiner

FIG.8
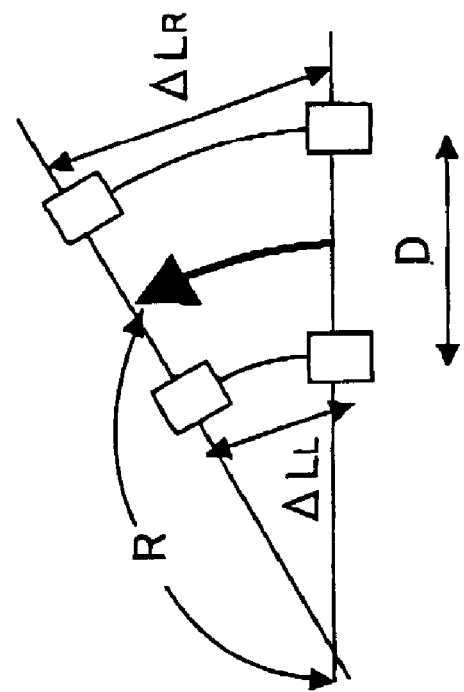
$$\text{CURVATURE}: 1/R = \frac{\Delta L_R - \Delta L_L}{\Delta L_R + \Delta L_L} \cdot \frac{2}{D}$$
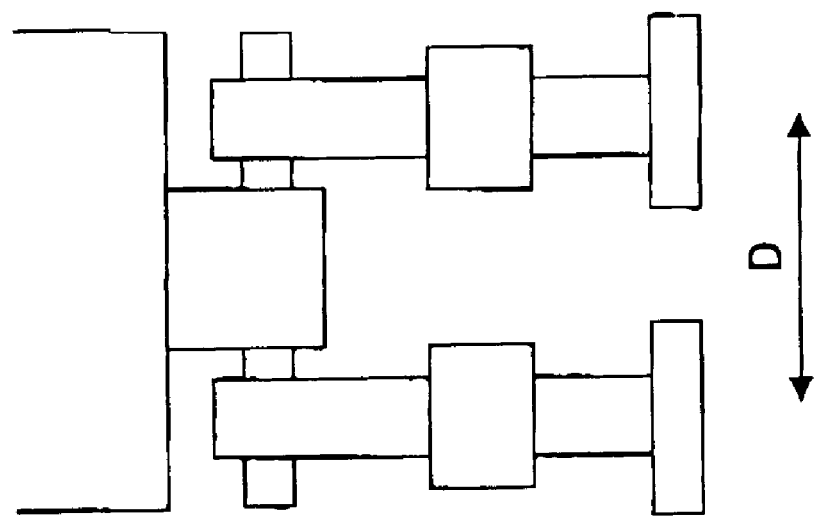

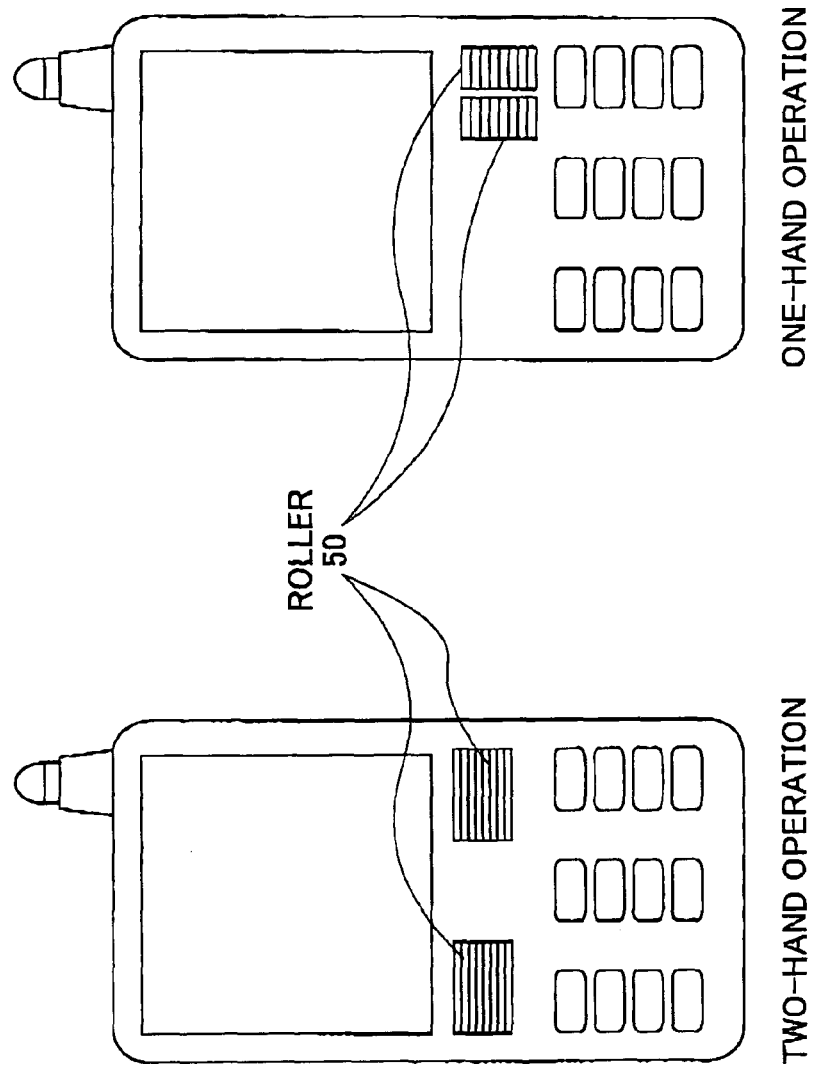

ROBOT REMOTE MANIPULATION SYSTEM AND REMOTE MANIPULATION DEVICE

BACKGROUND OF THE INVENTION

1. Field of the Invention

The present invention generally relates to a robot remote manipulation system and a robot remote manipulation device, and specifically relates to such systems and devices that remotely manipulate bipedal walking robots via communication networks.

2. Description of the Related Art

A variety of robot remote manipulation systems have been developed recently. As one prior art robot remote manipulation system, Tmsuk 04 (Robocon magazine No. 18, pp. 20–23, published by Ohm-sha in 2001) is known in which a robot can be remotely manipulated using a PHS line. In the Tmsuk 04 technology, an operator operates a master arm to control the motion of a robot as a slave. Another prior art manipulation system uses a joy stick. By moving the joy stick forward, backward, rightward or leftward, the moving direction, the length of a step and the walking speed of a robot can be controlled.

There is known one other prior bipedal walking robot remote manipulation system in which commands are inputted or a moving destination and route are inputted.

Such conventional bipedal walking robot remote manipulation systems, however, have comparatively large sizes. Further, while manipulating a robot in the conventional systems, it is not easy to be aware of forces applied to the legs of the robot and therefore it is not easy to control the robot.

SUMMARY OF THE INVENTION

Accordingly, it is one object of the present invention to provide a robot remote manipulation system and manipulation device, by which an operator can with ease remotely manipulate a bipedal walking robot and can be aware of forces applied to the legs of the bipedal walking robot.

Another and more specific object of the present invention is to provide a robot remote manipulation system including a bipedal walking robot and a remote manipulation device for remotely manipulating the bipedal walking robot, the robot being connected to the remote manipulation device via a communication network and controlled by controlling data from the remote manipulation device, the remote manipulation device comprising:

a pair of bilateral mechanical rotating elements each providing a quantity of motion for one of bilateral legs of the bipedal walking robot; and a controlling data transmitter for transmitting controlling data corresponding to the quantities of motion to the bipedal walking robot; and the bipedal walking robot comprising:

a controlling data receiver for receiving the controlling data transmitted from the remote manipulation device; and a leg motion controller for processing the received controlling data and causing the bilateral legs to move forward or backward.

Another object of the invention is to provide a remote manipulation device for remotely manipulating a bipedal walking robot connected to the remote manipulation device via a communication network, comprising:

a pair of bilateral mechanical rotating elements each providing a quantity of motion for one of bilateral legs of the bipedal walking robot; and a controlling data transmitter for transmitting controlling data corresponding to the quantities of motion to the bipedal walking robot.

A further object of the invention is to provide a remote manipulating method in a robot remote manipulation system including a bipedal walking robot and a remote manipulation device for remotely manipulating the bipedal walking robot, the robot being connected to the remote manipulation device via a communication network and controlled by controlling data from the remote manipulation device, the method comprising the steps of:

operating a pair of bilateral mechanical rotating elements in the remote manipulation device, and providing a quantity of motion for each of bilateral legs of the bipedal walking robot; and transmitting controlling data corresponding to the quantities of motion to the bipedal walking robot;

in the bipedal walking robot, receiving the controlling data transmitted from the remote manipulation device; and processing the received controlling data and causing the bilateral legs to move forward or backward.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an apparatus particularly pointed out in the specification in such full, clear, concise, and exact terms as to enable a person having ordinary skill in the art to practice the invention.

BRIEF DESCRIPTION OF THE DRAWINGS

FIG. 8 shows a relationship between the quantity of motion of the treadmill and the step length of the bipedal walking robot;

FIG. 11 shows schematic views of remote manipulation devices having rollers according to another embodiment of the invention.

DESCRIPTION OF THE PREFERRED EMBODIMENTS

In the following, embodiments of the present invention are described with reference to the accompanying drawings.

Figure 1:
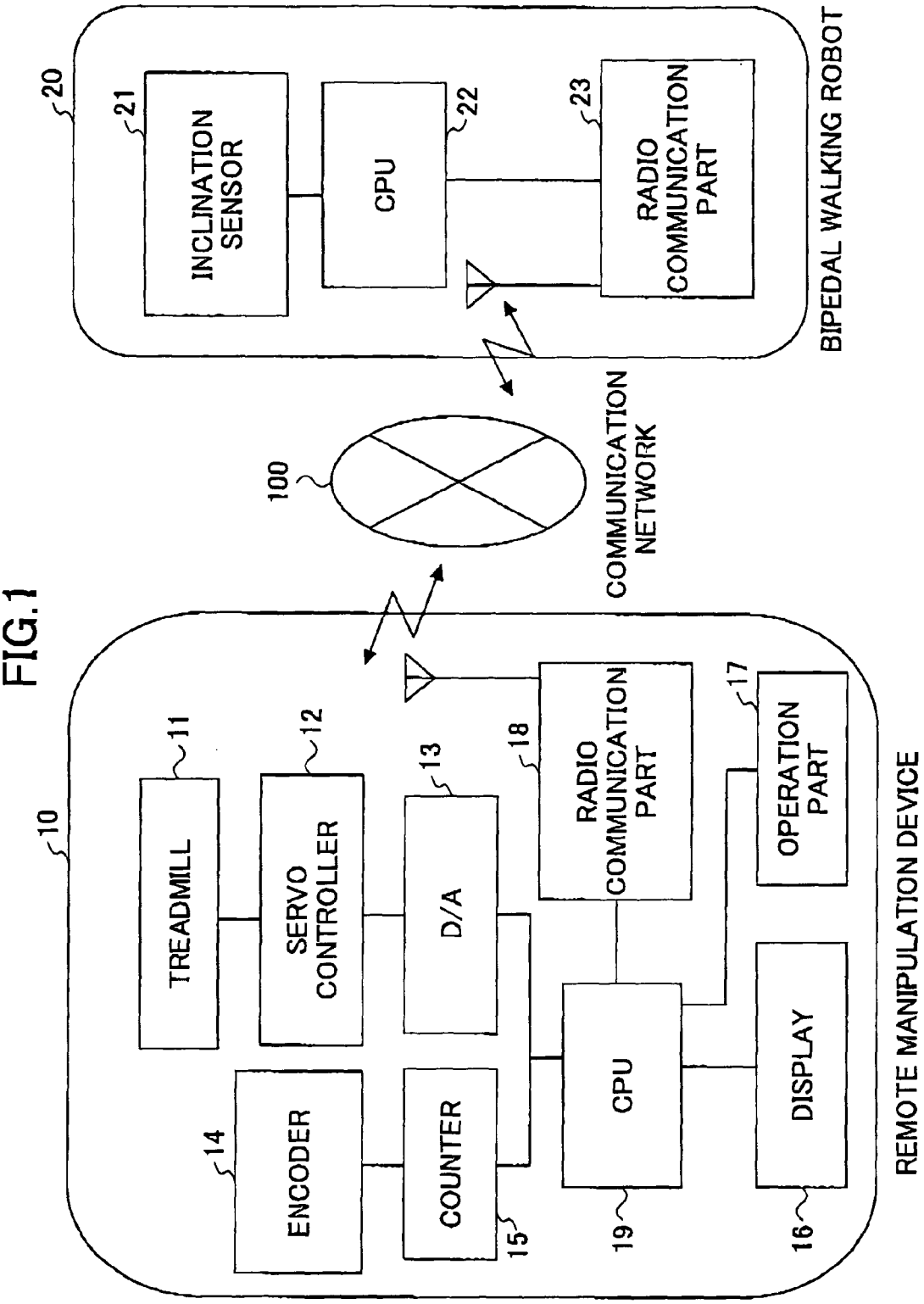
FIG. 1 shows a block diagram of a robot remote manipulation system according to the present invention.

FIG. 1 shows a block diagram of a bipedal walking robot remote manipulation system according to a first embodiment of the present invention.

The remote manipulation system shown in FIG. 1 includes a bipedal walking robot 20 (referred to as merely "robot" hereinafter) and a portable type remote manipulation device 10 capable of remotely manipulating the robot 20 via a communication network 100.

The remote manipulation device 10 includes a CPU 19 for controlling all the elements, a treadmill 11 having bilateral rotational belt mechanisms, a servo controller 12 for controlling outputs of motors for driving the rotational belts based on instructions from the CPU 19, and a D/A 13 for D/A converting an input to the servo controller.

The remote manipulation device 10 further includes an encoder 14 for detecting rotational angles, speeds and directions of the motors, a counter 15 for counting the number of pulses from the encoder 14, a display 16 for displaying audiovisual information sent from a CCD camera mounted on the robot, an operation part 17 such as a ten-key pad, and a radio communication part 18 for communicating with a base station (not shown) via the communication network 100.

The robot 20 includes an inclination sensor 21 for sensing an inclination angle of the robot, a CPU 22 for calculating the status of the robot legs based on the inclination angle sensed by the inclination sensor 21, and a radio communication part 23. The radio communication part 23 dataprocesses the status of the robot legs calculated by the CPU 22, and transmits the processed data (referred to as "force sense data" hereinafter) to a base station (not shown) via the communication network 100.

Figure 2:
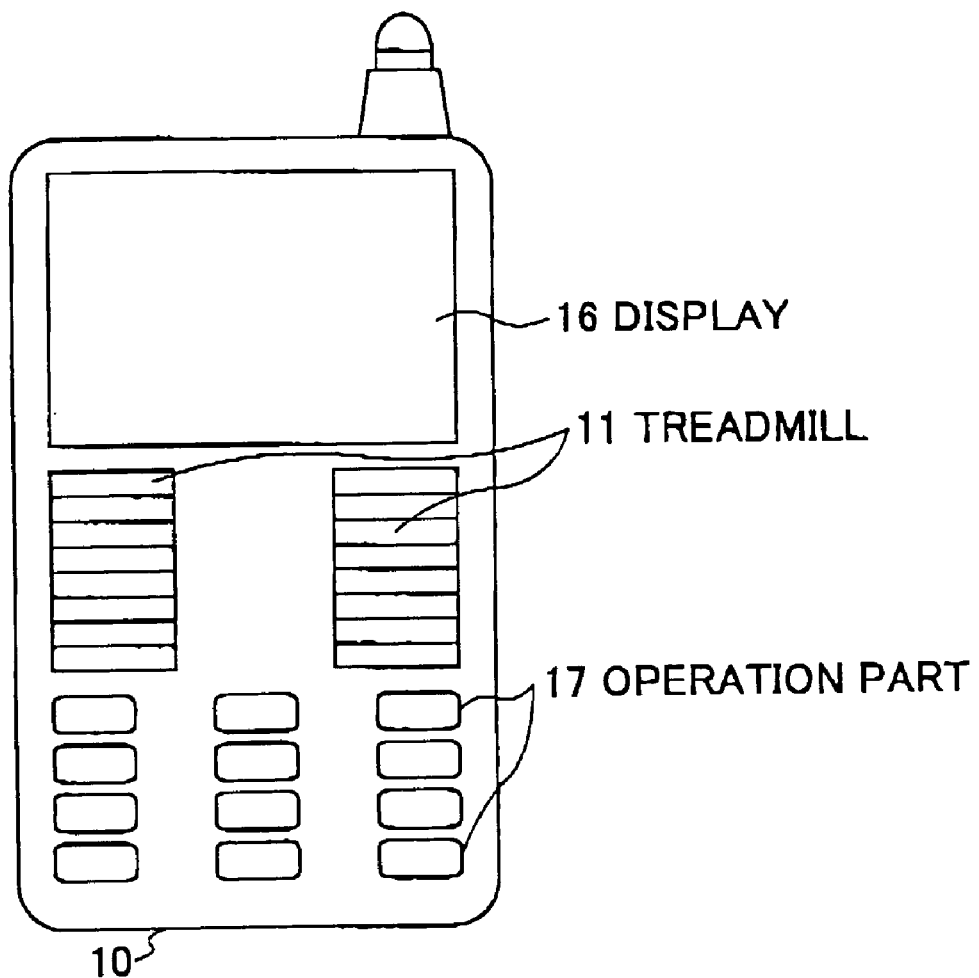
FIG. 2 is an exterior appearance view of the remote manipulation device shown in FIG. 1.

FIG. 2 is an exterior appearance view of the remote manipulation device 10 shown in FIG. 1.

Figure 3:
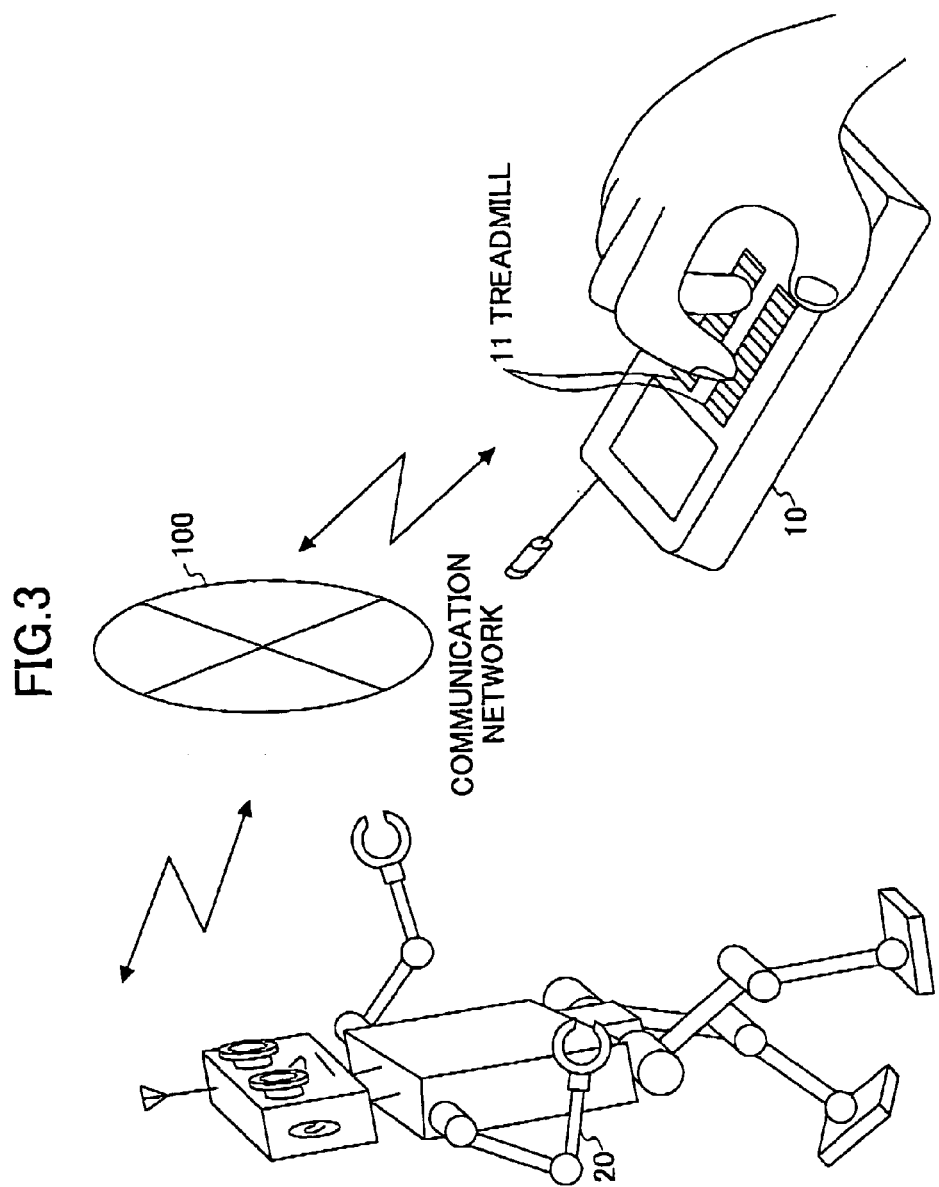
FIG. 3 illustrates a controlling technique of a bipedal walking robot using the remote manipulation device shown in FIG. 1.

The remote manipulation device 10 in FIG. 2 shows the display 16, the treadmill 11 and the operation part 17. As shown in FIG. 2, the treadmill 11 has a pair of bilateral rotational belts. According to the present invention, as shown in FIG. 3, the bilateral rotational belts can be rotated and moved by the index finger and the middle finger of an operator's dominant hand (right hand, for example), and the right and left treadmills can receive their respective quantities of motion. The quantities of motion are used for manipulating the robot leg movements.

Figure 4:
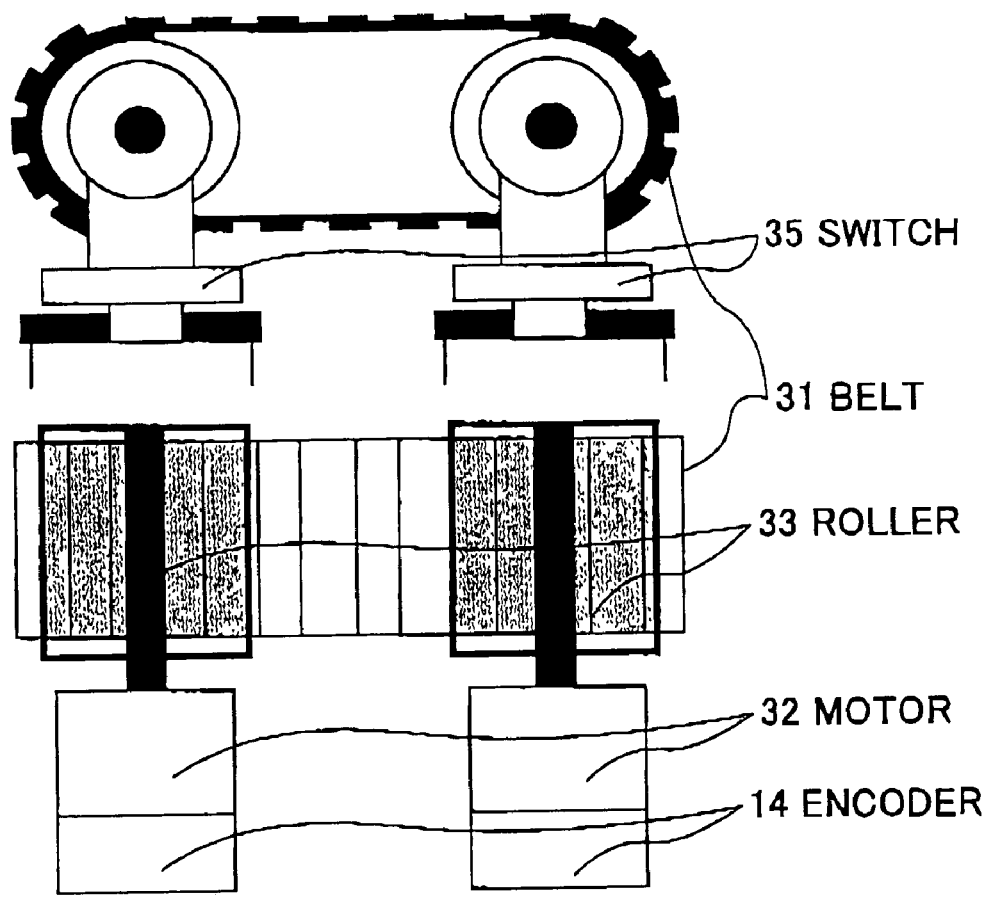
FIG. 4 shows schematic views of a treadmill mechanism used in the remote manipulation device shown in FIG. 1.

The treadmill can be configured as shown in FIG. 4, for example.

The treadmill 11 shown in FIG. 4 includes a rotational belt 31, a motor 32 for controlling resistance to the movement of the rotational belt 31, rollers 33 driven by the motor 32 to apply a resistance force to the rotational belt 31 wound around thereon, encoders 14 measuring the quantity of motion of the rotational belt 31 of the treadmill, and switches 35 sensing when the operator's finger touches the rotational belt 31.

In this treadmill 11, the belt can be rotated only when the switch 35 is ON. The encoders 14 (incremental encoders, for example) output pulses corresponding to the rotational angles of the rollers 33. By counting the pulses outputted from the encoders, the quantity of motion of the treadmill 11 can be determined. Instead of the incremental encoder, an absolute encoder can be used, of course. In the case of the absolute encoder, outputted absolute rotational angle is deemed to represent the treadmill motion quantity.

In this embodiment, when the robot walks up or down on a slope, the resistance to the movement of the rotational belt 31 of the treadmill 11 is controlled and made heavy or light, respectively. In more detail, the inclination sensor 21 mounted on the robot 20 measures the status of the robot 20. When it is determined that the robot is going up a slope based on the data measured by the inclination sensor 21, the belt movement of the treadmill 11 is made heavy. When it is determined that the robot is going down a slope based on the data measured by the inclination sensor 21, the belt movement of the treadmill 11 is made light. This resistance control is explained below.

Figure 5:
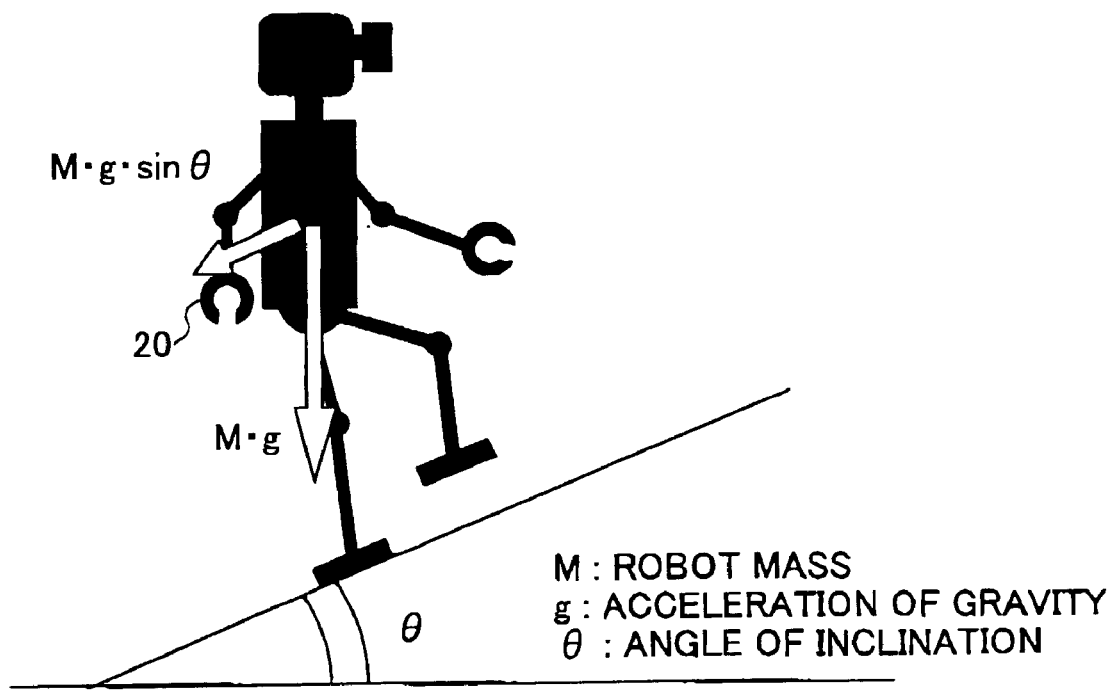
FIG. 5 illustrates a force applied to the bipedal walking robot on a slope.

FIG. 5 illustrates a force applied to the bipedal walking robot 20 walking on a slope In FIG. 5, when the robot 20 is going to walk up the slope having an inclination angle θ, a force Mgsin θ is applied to the robot in the down-slope direction, where M represents the mass of the robot and g represents the acceleration of gravity. In this case, a force $C_0 Mg\sin\theta$ generated by the motor 32 is applied to the treadmill 11 ($C_0$ is a constant), and therefore the force applied to the robot 20 is indirectly fed back to the operator's fingers on the treadmill 11.

When the upslope is steeper (θ becomes larger), the motor 32 provides a feed-back force to the treadmill 11 and makes it difficult to move the belt 31 of the treadmill 11. On the other hand, when the slope is downward (θ becomes negative), the motor 32 provides a feed-back force to the treadmill 11 and makes it easy to move the belt 31 of the treadmill 11. These feed-back forces are generated only when the operator's finger touches the belt 31 of the treadmill 11 (only when the switch 35 mounted on the treadmill 11 is ON).

Figure 6:
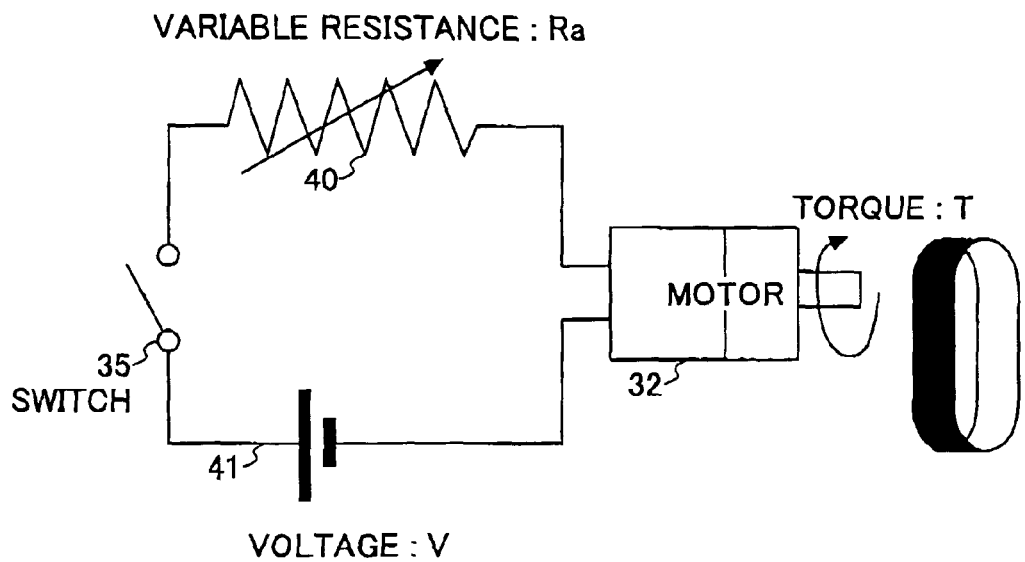
FIG. 6 is a schematic diagram of a circuit for feeding the force back to the treadmill.

In this embodiment an electric circuit as shown in FIG. 6 is used for generating the above force $C_0 Mg\sin\theta$ against the treadmill 11.

FIG. 6 is a schematic diagram of an electric circuit for feeding the above force back to the treadmill 11. The circuit includes a motor 32 generating a torque T, a battery having a voltage V, a switch 35 and a variable resistance Ra 40. The variable resistance Ra can be varied depending on force sense data transmitted from the robot, and therefore a voltage applied to the motor 32 can be varied according thereto. As a result, the torque T can be controlled so that the motor 32 generates a force $C_0 Mg\sin\theta$ corresponding to the slope inclination θ, and therefore the resistance of the belt 31 of the treadmill 11 reflects the status of the robot walking on the slope having the inclination angle θ.

The resistance Ra in the above electric circuit can be obtained in the following equation (1).

$$Ra = \frac{K}{T}(V - K \cdot \omega) \quad (1)$$

This Ra can be represented as in the following equation (2), where the quantity of motion for the slope θ is Δl $$Ra = \frac{K}{C_0 \cdot M \cdot g \cdot \sin\theta}(V - C_1 \cdot \Delta l) \quad (2)$$

Where K is a counter-electromotive force constant of the motor; Δl is the quantity of motion of the treadmill; and $C_0$, $C_1$, are constants.

Figure 7:
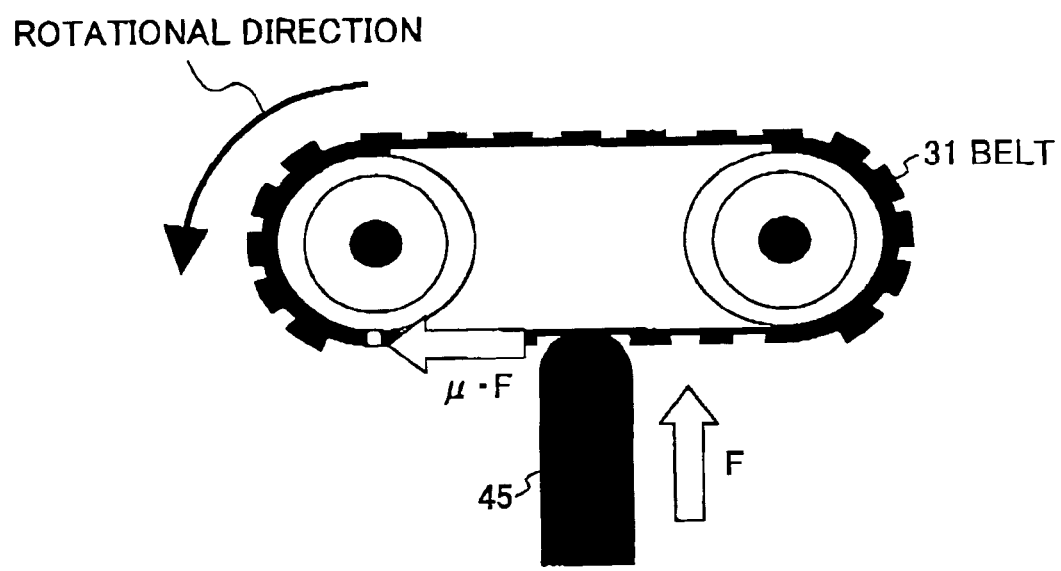
FIG. 7 shows another example of feeding the force back to the treadmill.

FIG. 7 shows another example of feeding the force back to the treadmill 11.

As shown in FIG. 7, this example uses a bar-like module 45, which is pressed against the treadmill 11 by a force F to control the resistance of the belt 31 of the treadmill 11. Where the friction coefficient between the belt 31 and the module 45 is represented by μ, the force F generates a friction force μF on the belt 31. Accordingly, by varying F so that μF becomes equal to $C_0 Mg\sin\theta$, the treadmill 11 can receive a backward force of $C_0 Mg\sin\theta$.

The manner for feeding a force back to the treadmill is not limited to the above explained methods and can be fed back in a variety of ways within the scope of the present invention.

Next, referring to FIG. 8, the relationship between finger motion quantity on the treadmill 11 and robot leg movement is explained. If a quantity of motion of the left treadmill (operated by an index finger) is represented by $\Delta l_l$ and a quantity of motion of the right treadmill (operated by a middle finger) is represented by $\Delta l_r$, movements of left and right leg steps are represented by $\Delta L_L$ and $\Delta L_R$, respectively, then the relation as $\Delta l_l$: $\Delta l_r = \Delta L_L$: $\Delta L_R$ holds. The distance between two legs of the robot is represented by D.

Where the minimum turning radius of the robot 20 is represented by R, the curvature ρ having this radius R is obtained by the following equation (3):

$$\rho = \frac{1}{R} = \frac{\Delta L_R - \Delta L_L}{\Delta L_R + \Delta L_L} \frac{2}{D} \quad (3)$$

Where the quantity of motion of the left treadmill is smaller, the robot turns to the left. When the quantities of motion of the left and right treadmills are equal, the robot walks straight. On the other hand, by moving the treadmill backward the robot can walk backward. Therefore, it is possible to manipulate the bipedal walking robot freely, such as walking forward, walking backward and turning.

Figure 9:
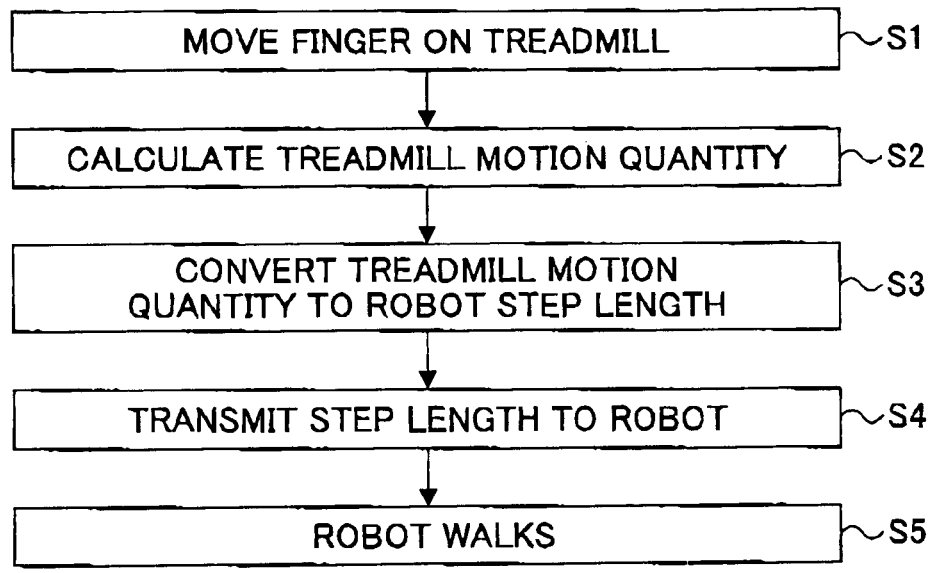
FIG. 9 is a flowchart for illustrating a remote manipulation process of the robot using the remote manipulation system shown in FIG. 1.

Referring to a flowchart shown in FIG. 9, a process for manipulating the robot legs using the remote manipulation system in FIG. 1 is explained.

In FIG. 9, the robot 20 and the remote manipulation device 10 communicate with each other via a communication network to exchange information.

When an operator's finger moves on the treadmill 11 of the remote manipulation device 20 (S1), the encoder 14 measures the number of pulses outputted by the treadmill 11. The number of pulses corresponds to an angular amount of movement of the rotated belt. The measured result is transmitted to the CPU 19. The CPU 19 calculates a quantity of motion of the treadmill 11, based on the measured results sent by the encoder 14(S2). The quantity of motion of the treadmill 11 is converted to step length data of the robot 20(S3), and the converted step length data are transmitted to the radio communication part 18. The radio communication part 19 performs a coding process, a modulation process, and a frequency conversion process and other processes on the step length data, and transmits the processed data to a base station (not shown) via the communication network 100(S4).

The step length data transmitted by the remote manipulation device 10 in the above mentioned manner is received at the radio communication part 23 of the robot 20 via the communication network 100. After receiving the step length data transmitted by the remote manipulation device 10, the radio communication part 23 of the robot 20 performs a frequency conversion process, a demodulation process, a decoding process and other processes on the step length data, and outputs the processed step length data to a mechanism for controlling the legs of the robot. Then the legs of the robot 20 are controlled based on the processed step length data (S5).

In the above explained embodiment, an operator of the remote manipulation device 10 can remotely manipulate the robot 20 while monitoring an image on the display 16, which is sent from a CCD camera (not shown) mounted on the robot 20. However, if the operator can directly see the robot 20 at a near distance, he/she does not have to monitor the display 16 for manipulating the robot 20.

In the above embodiment, the conversion calculation from the treadmill motion quantity to the robot step length is carried out by the CPU 19 in the remote manipulation device 10. The present invention is not limited to such embodiment. For example, the remote manipulation device 10 may perform the transmission of the treadmill motion quantity only, and CPU 22 in the robot 20 can then perform calculations relating to conversion from the treadmill motion quantity to the robot step length.

Figure 10:
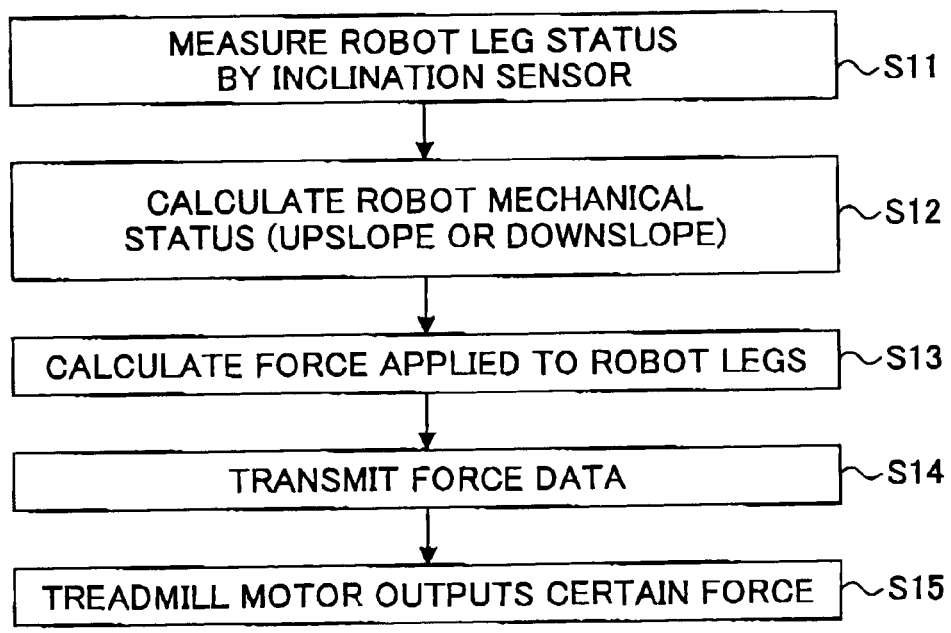
FIG. 10 is a flowchart for illustrating a control process of the treadmill resistance using information obtained by an inclination sensor provided in the robot.

Next, referring to the flowchart shown in FIG. 10, a process for controlling the treadmill resistance based on information obtained by the inclination sensor 21 mounted in the robot 20 is explained.

The inclination sensor 21 mounted in the robot 20 senses an inclination angle of the robot 20 (S11), and sends the inclination information indicating the status of the robot legs to the CPU 22. After receiving the inclination information, the CPU 22 calculates the mechanical status of the robot (whether the robot is on an up slope or a down slope) based on the inclination information (S12), and calculates forces applied to the legs of the robot (S13):

The calculated results are sent from the CPU 22 to the radio communication part 23. The radio communication part 23 performs a coding process, a modulation process, a frequency conversion process and other processes on the calculated results, and transmits the converted results as force sense data to a base station (not shown) via the communication network 100(S14).

As explained above, the force sense data transmitted by the robot 20 is received at the radio communication part 18 of the remote manipulation device 10. The radio communication part 18 performs a frequency conversion process, a demodulation process, and a decoding process on the force sense data, and outputs the processed data to the motor 32 of the treadmill 11 of the CPU 19 (S15). The motor 32 of the treadmill 11 outputs a certain force based on instruction from the CPU 19. Accordingly, the belt 31 of the treadmill 11 rotates with resistance corresponding to the force applied to the robot legs, and therefore the operator can manipulate the steps of the robot 20 while being aware of the walking condition of the robot 20.

In the above embodiment, the calculation of the force applied to the robot legs is carried out by the CPU 22 in the robot 20. The present invention is not limited to such embodiment. For example, the robot 20 may perform the transmission of the output of the inclination sensor only, and the CPU 19 in the remote manipulation device 10 can then calculate the force applied to the legs of the robot 20 on a slope based on the output from the inclination sensor.

Referring to FIG. 11, a second embodiment of the present invention is explained. According to the second embodiment, a remote manipulation device 10 includes a pair of bilateral rollers 50 as shown in FIG. 11, instead of the treadmill 11. Using the rollers, the bipedal walking robot can be remotely manipulated. The rollers shown in the left device in FIG. 11 are spaced apart from each other and can be operated with thumbs of both hands. The rollers shown in the right device in FIG. 11 are close together and can be operated with one or two fingers on one hand.

The remote manipulation device may have other types of mechanisms such as a pair of gear mechanisms used in portable audio equipment.

The above explained remote manipulation device 10 may be any kind of mobile terminal connectable to a communication network such as mobile radio terminals (e.g. mobile phones) connectable to a mobile communication network, notebook computers, and PDAs. The communication network can be any kind of network such as a public network, a radio LAN, and an IP network, as long as the mobile terminals have a radio communications interface that can be used to connect to the utilized communication network.

According to the embodiments of the present invention, the operator of the remote manipulation device can remotely manipulate robot steps by moving his fingers in a manner of simulating human walking while being aware of mechanical conditions such as forces applied to the robot, which awareness cannot be obtained through a display. And the remote manipulation device can be miniaturized.

Further, real time manipulation can be attained because the system utilizes a mobile communication network. The walking area of a manipulated robot is not limited, because the robot can utilize a mobile communication network and its roaming services.

The present application is based on Japanese Priority Patent Application No. 2002-241075 filed on Aug. 21, 2002 with the Japanese Patent Office, the entire contents of which are hereby incorporated by reference.

What is claimed is:

1. A robot remote manipulation system including a bipedal walking robot and a remote manipulation device for remotely manipulating the bipedal walking robot according to controlling data, the robot being connected to the remote manipulation device via a communication network, the remote manipulation device comprising:
a pair of bilateral mechanical rotating elements each providing a quantity of motion for one of bilateral legs of the bipedal walking robot; and
a controlling data transmitter for transmitting the controlling data corresponding to the quantities of motion to the bipedal walking robot, the bipedal walking robot comprising:
a controlling data receiver for receiving the controlling data transmitted from the remote manipulation device;
a leg motion controller for processing the received controlling data and causing the bilateral legs to move forward or backward according to the controlling data;
a sensor for sensing environmental information; and
a force sense data transmitter for calculating forces applied to the bilateral legs based on the environmental information from the sensor, and transmitting the calculated result to the remote manipulation device as force sense data.

2. The robot remote manipulation system as claimed in claim 1,
the remote manipulation device further comprising:
a resistance adjuster for controlling motors for rotating each of the bilateral mechanical rotating elements, respectively, based on the force sense data transmitted from the bipedal walking robot, and adjusting resistance of the rotating motion of the bilateral mechanical rotating elements.

3. The robot remote manipulation system as claimed in claim 1, wherein the sensor comprises an inclination sensor for sensing inclination information of the bipedal walking robot.

4. A remote manipulation device for remotely manipulating a bipedal walking robot connected to the remote manipulation device via a communication network, comprising:
a pair of bilateral mechanical rotating elements each providing a quantity of motion for one of bilateral legs of the bipedal walking robot;
a controlling data transmitter for transmitting controlling data corresponding to the quantities of motion to the bipedal walking robot; and
a receiver for receiving force sense data from the bipedal walking robot via the communication network, the force sense data being sensed by a sensor provided in the bipedal walking robot and indicating forces applied to the bilateral legs on the bipedal walking robot.

5. The robot remote manipulation device as claimed in claim 4, wherein the controlling data transmitter controls the bilateral mechanical rotating elements to adjust lengths of steps of the bipedal walking robot based on the quantities of motion.

6. The robot remote manipulation device as claimed in claim 4, wherein the controlling data transmitter controls the bilateral mechanical rotating elements to turn the bipedal walking robot based on a difference between the respective quantities of motion.

7. The robot remote manipulation device as claimed in claim 4, further comprising:
a resistance adjuster for receiving force sense data via a communication network from the bipedal walking robot, the force sense data being obtained based on information sensed by an inclination sensor provided in the bipedal walking robot and indicating force applied to the bilateral legs of the bipedal walking robot, and for controlling motors for rotating each of the bilateral mechanical rotating elements, respectively, based on the force sense data transmitted from the bipedal walking robot, and adjusting resistance of the rotating motion of the bilateral mechanical rotating elements.

8. The robot remote manipulation device as claimed in claim 4, wherein the bilateral mechanical rotating elements comprise treadmills having rotary belts or rollers.

9. The robot remote manipulation device as claimed in claim 4, further comprising:
a display for displaying an image transmitted from an imaging device of the bipedal walking robot.

10. A remote manipulating method in a robot remote manipulation system including a bipedal walking robot and a remote manipulation device for remotely manipulating the bipedal walking robot according to controlling data, the robot being connected to the remote manipulation device via a communication network, the method comprising the steps of:
operating a pair of bilateral mechanical rotating elements in the remote manipulation device, and providing a quantity of motion for each bilateral leg of the bipedal walking robot;
transmitting the controlling data corresponding to the quantities of motion to the bipedal walking robot;
in the bipedal walking robot, receiving the controlling data transmitted from the remote manipulation device;
processing the received controlling data and causing the bilateral legs to move forward or backward according to the controlling data; and
calculating forces applied to the bilateral legs based on environmental information sensed by a sensor, and transmitting the calculated result to the remote manipulation device as force sense data.

* * * * *